United States Patent
Ou et al.

(10) Patent No.: US 9,231,972 B2
(45) Date of Patent: Jan. 5, 2016

(54) MALICIOUS WEBSITE IDENTIFYING METHOD AND SYSTEM

(71) Applicant: Tencent Technology (Shenzhen) Company Limited, Shenzhen (CN)

(72) Inventors: Xiao Dong Ou, Shenzhen (CN); Wen Liang Tang, Shenzhen (CN); Jiu Biao Chen, Shenzhen (CN); Ying Xing Cai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 83 days.

(21) Appl. No.: 14/160,409

(22) Filed: Jan. 21, 2014

(65) Prior Publication Data
US 2014/0137254 A1 May 15, 2014

Related U.S. Application Data (63) Continuation of application No. PCT/CN2013/085614, filed on Oct. 21, 2013.

(30) Foreign Application Priority Data

Nov. 13, 2012 (CN) .......................... 2012 1 0453962

(51) Int. Cl.
*H04L 29/00* (2006.01)
*H04L 29/06* (2006.01)

(52) U.S. Cl.
CPC .......... *H04L 63/145* (2013.01); *H04L 63/0227* (2013.01); *H04L 63/0236* (2013.01);
(Continued)

(58) Field of Classification Search
CPC . G06F 21/05; G06F 2221/2119; H04L 63/02; H04L 63/14
USPC ..................... 726/1–4, 11–13, 16–17, 21–24; 713/187–188; 709/217–229
See application file for complete search history.

(56) References Cited

U.S. PATENT DOCUMENTS 5,889,958 A * 3/1999 Willens .......................... 709/229
6,233,618 B1 * 5/2001 Shannon ........................ 709/229
(Continued)

FOREIGN PATENT DOCUMENTS

CN  102075502  5/2011
CN  102469113  5/2012

OTHER PUBLICATIONS

Zhang, Jian, Phillip A. Porras, and Johannes Ullrich. "Highly Predictive Blacklisting." USENIX Security Symposium. 2008.*
(Continued)

*Primary Examiner* — Madhuri Herzog
(74) *Attorney, Agent, or Firm* — Morrison & Foerster LLP (57) ABSTRACT

The present disclosure discloses a method of identifying malicious websites. The method includes: filtering a target website using a local website-filtering list; if the target website is not on the local website-filtering list, filtering the target website using a server website-filtering list. The present disclosure also discloses, based on the above-described method, a system for identifying malicious websites. By using the disclosed malicious website identifying method and system, the number of times needed to access a network to identify malicious websites can be reduced effectively. That is, the number of times that the identification calculation is performed by a network server can be reduced and, thus, increasing the speed of the identification process and reducing network traffic. As a result, the efficiency of the malicious website identifying process can be improved.

3 Claims, 7 Drawing Sheets

(52) U.S. Cl.
CPC ........ *H04L63/1408* (2013.01); *H04L 63/1441* (2013.01); *G06F 2221/2119* (2013.01); *H04L 63/0263* (2013.01)

(56) References Cited

U.S. PATENT DOCUMENTS

| | | | | |
|---|---|---|---|---|
| 7,698,442 | B1* | 4/2010 | Krishnamurthy et al. | 709/229 |
| 8,650,653 | B2* | 2/2014 | Poornachandran et al. | 726/26 |
| 2004/0006621 | A1* | 1/2004 | Bellinson et al. | 709/225 |
| 2005/0065935 | A1* | 3/2005 | Chebolu | G06F 9/44505 |
| 2006/0080735 | A1 | 4/2006 | Brinson et al. | |
| 2008/0279200 | A1* | 11/2008 | Shatzkamer | H04L 63/0892 370/401 |
| 2008/0307412 | A1* | 12/2008 | Marr et al. | 717/177 |

OTHER PUBLICATIONS

Du, Rongbo, Reihaneh Safavi-Naini, and Willy Susilo. "Web filtering using text classification." Faculty of Informatics-Papers (2003): 166.*

International Search Report mailed Jan. 23, 2014, directed towards International Application No. PCT/CN2013/085614; 3 pages.

* cited by examiner

MALICIOUS WEBSITE IDENTIFYING METHOD AND SYSTEM

CROSS REFERENCE TO RELATED APPLICATION

This application is a U.S. continuation application under 35 U.S.C. §111(a) claiming priority, under 35 U.S.C. §120 and 365(c), to International Application No. PCT/CN2013/085614 filed on Oct. 21, 2013, which claims the priority benefit of Chinese Patent Application No. 201210453962.3, filed on Nov. 13, 2012, the contents of both the PCT application and the Chinese application are incorporated by reference herein in their entirety for all purposes.

FIELD

This disclosure relates to the computer technology field, and in particular, to malicious website identifying methods and systems.

BACKGROUND

Currently, network technologies are developing rapidly. More and more people have started to have access to the Internet. Large number of websites provides many selections for the users. However, there are many malicious websites on the Internet. They can cause problems such as fraudulent charges, phishing scams, and system viruses, to the Internet users when accessing the Internet.

A typical method of identifying malicious websites can use a website database created by an operational service. The database can try to collect as many known malicious websites and harmless websites as possible. The method can allow a user terminal to visit the website database and perform identification using a network server and then send the result of the identification to the user terminal.

This typical method of identifying malicious websites has the problem of taking too long of a time to identify malicious websites, making the process too slow and, thus, effecting the efficiency of the identification process.

SUMMARY

As such, there is a need to provide, in response to the low efficiency issue with the typical method, a relatively high efficiency method and system for identifying malicious web sites.

A malicious website identifying method can include the following exemplary steps.

Filtering a target website using a local website-filtering list, if the target website includes a connection-permitted website on the local website-filtering list, permitting a connection to the target web site. If the target web site includes a connection-prohibited website on the local website-filtering list, blocking a connection to the target website.

If the target website is not on the local website-filtering list, filtering the target website using a server website-filtering list. If the target website includes a connection-prohibited website on the server website-filtering list, blocking a connection to the target web site. If the target web site includes a connection-permitted web site on the server website-filtering list or is not on the server website filtering list, permitting a connection to the target web site.

A malicious website identifying system can include the following exemplary modules.

A local website-filtering module that filters a target website: if the target website includes a connection-permitted website in the local website-filtering module, permitting a connection to the target web site. If the target web site includes a connection-prohibited website in the local website-filtering module, blocking a connection to the target website.

A server website-filtering module that filters the target website if the target website is not in the local website-filtering module: if the target website includes a connection-prohibited website in the server website-filtering module, blocking a connection to the target website. If the target website includes a connection-permitted website in the server website-filtering module or is not in the server website-filtering module, permitting a connection to the target website.

The above-described malicious website identifying method and system can filter a target website using a local website-filtering list or a local website-filtering module. If the target website is not a part of the local website-filtering list or local website-filtering module, the target website can be filtered using a server website filtering list or a server website filtering module. This hierarchical approach to identify malicious websites can effectively reduce the number of times required to connect to a network to identify a malicious website. That is, it reduces the number of times that the identification calculation is performed by a network server and, thus, increasing the speed of the identification process and reducing network traffic, and thereby improving the efficiency of the malicious website identifying process. For example, when a mobile phone is browsing a webpage, because the network access speed of the mobile phone as a mobile communication device can be restricted, reducing the number of times it needs to access the network can greatly improve the efficiency of identifying malicious websites. As such, the above-described malicious website identifying method and system are especially suitable for use in mobile communication devices.

BRIEF DESCRIPTION OF THE DRAWINGS

To better explain the technical solutions in the embodiments of the disclosure, the figures discussed in the following embodiments are briefly introduced. It should be understood that the figures described below correspond to only some of the embodiments and that other figures can be derived from these figures.

DETAILED DESCRIPTION

A detailed description of the technical solutions of the embodiments of the present disclosure is provided below in view of the accompanying drawings. It should be understood that the embodiments described below are representative embodiments of the present disclosure rather than a complete disclosure of the every possible embodiment. The present disclosure can also include any other embodiments that can be derived from these disclosed embodiments by a person with ordinary skill in the art without any additional inventive work. It is to be understood that other embodiments can be used and structural changes can be made without departing from the scope of the embodiments of this disclosure.

Currently, using a computer or mobile phone to access the Internet has become common practice. Accessing the Internet requires getting exposed to websites, some of which can, for example, spread harmful information, and even steal visitors' personal information and spread viruses to damage the devices. Such websites can be referred to as malicious websites. However, it should be understood that malicious websites can also include other types of harmful websites or websites that are not desirable to a user or a group of users. For example, malicious websites can also include adult-schemed websites that are not suitable for children. In various embodiments, the term "malicious websites" can include different types of websites and/or be defined by the user/user groups based on his/their own preferences. The following embodiments disclose a malicious website identifying method and system. To make the description easy to understand, the embodiments are discussed with reference to the exemplary scenario of using a browser on a mobile device to browse websites. However, it should be understood that the disclosed methods and systems can be used with any other types of suitable website-accessing tools and on any types of devices. Such devices can include, but are not limited to, PCs, Macs, desktop computers, laptop computers, tablet PCs, smartphones including iPhones, Android phones, Windows phones, and Blackberries, e-readers, in-car communication devices, televisions, gaming consoles and other consumer electronic devices. Preferably, the devices are network-enabled and/or can access one or more types of websites including, for example, public websites, private websites, websites hosted on the Internet, an extranet, or any other types of open or closed web server.

Figure 1:
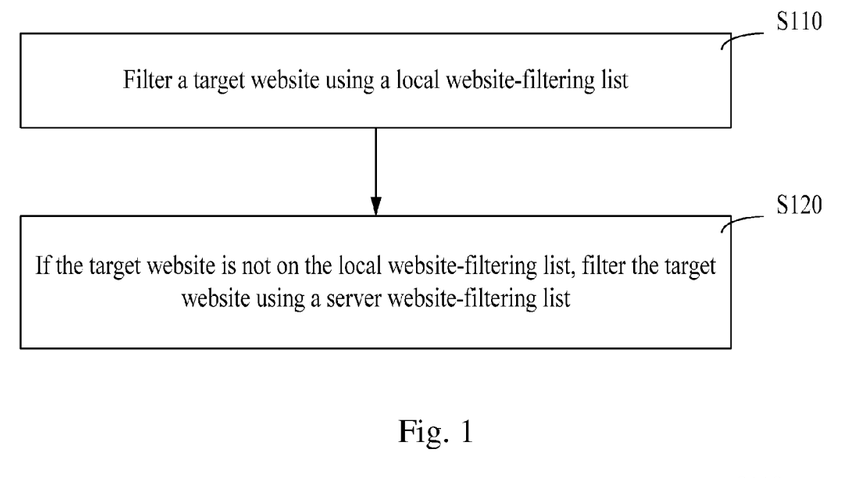
FIG. 1 is a flowchart illustrating the exemplary steps in a malicious website identifying method, according to a first embodiment of the disclosure.

As illustrated in FIG. 1, a malicious website identifying method can be provided. The method can include the following exemplary steps.

Step S110: filtering a target website using a local website-filtering list, if the target website includes a connection-permitted website on the local website-filtering list, permitting a connection to the target website, if the target website includes a connection-prohibited website on the local website-filtering list, blocking a connection to the target website. Websites added to the local website-filtering list can include websites frequently accessed by the user and already confirmed as harmless websites and/or websites already confirmed to be malicious websites. The origin of a particular website can be a malicious website encountered during regular browsing or confirmed by an authoritative operator or system such as an antivirus program. In this embodiment, the target website can be a website accessible via the browser of the mobile phone when the mobile phone is used for accessing the Internet. At this time, the system can make a series of determinations regarding the website to be visited (i.e., target website), starting with determining whether the website is a connection-permitted website, i.e., whether the website is a safe website, using a local website-filtering list. If yes, a connection to the website can be permitted. If not, it can be determined whether the website is a malicious website using the local website-filtering list. If the website is determined to be a malicious website, it can be blocked from being accessed. Here, blocking access to a website can refer to the system sending a warning to the user but permitting access to the website if the user still visits the website after confirming the warning message. Alternatively, blocking access can also refer to directly blocking any visit to the website. For example, it may be a mobile phone user having root rights taking the measure of blocking direct access to the website when the mobile phone is used for accessing the Internet.

Step S120: if the target website is not on the local website-filtering list, filtering the target website using a server website-filtering list, if the target website includes a connection-prohibited website on the server website-filtering list, blocking a connection to the target website, if the target website includes a connection-permitted website on the server website-filtering list or is not on the server website filtering list, permitting a connection to the target website. The server website-filtering list can include one or more websites stored on the backend server. In comparison to the local website-filtering list, the website information stored in the server website-filtering list can be more up-to-date. That is, the server website-filtering list can include one or more updated connection-permitted and connection-prohibited websites. A user can connect to the server website-filtering list via a network to perform verification of a target website in order to determine whether the website is a malicious website. If the website is determined to be a connection-permitted website or not to be a malicious website, a connection to the website can be permitted. If the website is determined to be a connection-prohibited website, alert information can be sent out. If a mobile phone is used for accessing the Internet, a measure to block the target website can also be taken against a mobile phone user having root rights.

The above-described malicious website identifying method and system can filter a target website using a local website-filtering list. If the target website is not a part of the local website-filtering list, the target website can be filtered using a server website filtering list. This hierarchical approach to identify malicious websites can effectively reduce the number of time required to connect to the network to identify a malicious website. That is, it reduces the number of times that the identification calculation is performed by a network server and, thus, increasing the speed of the identification process and reducing network traffic, and thereby improving the efficiency of the process of identifying malicious websites.

Figure 2:
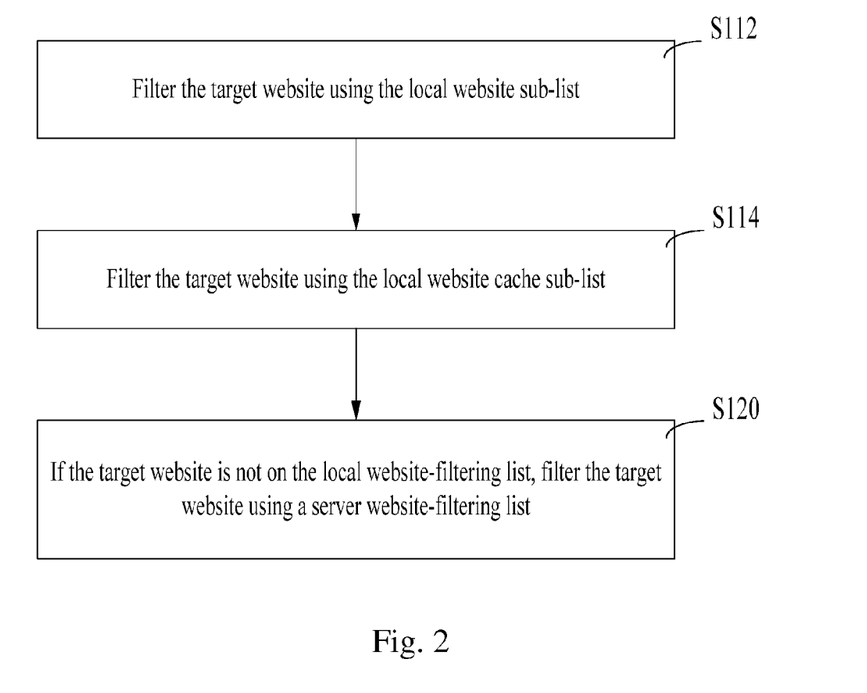
FIG. 2 is a flowchart illustrating the exemplary steps of a malicious website identifying method, according to a second embodiment of the disclosure.

In another embodiment of the malicious website-filtering method, as illustrated in FIG. 2, filtering a target website using a local website-filtering list can include sequentially filtering the target website using a local website-filtering sub-list and a local website cache sub-list. The local website-filtering sub-list can store a common malicious website as a connection-prohibited website and a common harmless website as a connection-permitted website. The local website cache sub-list can store a dynamically updated malicious website as a connection-prohibited website and a dynamically updated harmless website as a connection-permitted website. The method can include the following exemplary steps.

Step S112: filtering the target website using the local website sub-list: if the target website includes a connection-permitted website on the local website sub-list, permitting a connection to the target website, if the target website includes a connection-prohibited website on the local website sub-list, blocking a connection to the target website. The connection-permitted and connection-prohibited websites stored on the local network website sub-list can be stored permanently on the local website sub-list. They can be controlled and updated by the operation and maintenance staff. Websites can be added or deleted from the local website sub-list via, for example, a cloud server. The system default can be set to neither adding nor deleting any of the websites. It can also be defined by the user.

Step S114, filtering the target website using the local website cache sub-list: if the target website includes a connection-permitted website on the local website cache sub-list, permitting a connection to the target website, if the target website includes a connection-prohibited website on the local website cache sub-list, blocking a connection to the target website. The connection-permitted websites and connection-prohibited websites stored in the local website cache sub-list can be stored dynamically in the local website cache sub-list. The backend server can increasingly push connection-permitted and connection-prohibited websites to the local website cache list. In addition, the server can push connection-permitted and connection-prohibited websites to the local website cache sub-list, as needed. For example, if a situation such as a serious Internet security-breaching incident or a sudden outbreak of malicious websites is involved, the system can push information regarding the malicious websites to the local website cache sub-list using cloud instructions.

In this embodiment, the local website-filtering list can be divided into a local website sub-list and a local website cache sub-list, and the target website can be sequentially filtered using the local website sub-list and local website cache sub-list. The local website sub-list can store one or more common malicious websites as connection-prohibited websites and store one or more common harmless websites as connection-permitted websites. The target website can be filtered using the local website sub-list first to guarantee that, when the target website is identified as a common malicious website or a common harmless website, a determination can be made right away, thus effectively reducing the time required for filtering the target website. If the local website sub-list does not include the target website, the local website cache sub-list can then be used for verifying the target website. The local website cache list can store one or more dynamically updated malicious websites as connection-prohibited websites and store one or more dynamically updated harmless websites as connection-permitted websites. The accuracy of identifying a malicious website and a harmless website can be improved by dynamically updating the local website cache sub-list.

In another embodiment, when filtering the target website using the server website-filtering list, the method can further include: if a connection to the target website is permitted, pushing the target website to the local website cache sub-list to be stored as a connection-permitted website, if a connection to the target website is not permitted, pushing the target website to the local website cache sub-list to be stored as a connection-prohibited website. If the target website is determined to be a safe website, the website can be pushed to the local website cache sub-list as a connection-permitted website. If the target website is determined to be a malicious website, the website can be pushed to the local website cache sub-list as a connection-prohibited website. This can continue the updating of the websites on the local website cache sub-list in real time. When there is a sudden outbreak of malicious websites or when a website is manually determined to be a malicious website, the operation and maintenance staff can push the malicious website and harmless websites to the corresponding local website cache sub-list.

In addition, the above-described method can also include the steps of regularly updating the connection-permitted websites and the connection-prohibited websites in the local website sub-list, and detecting the local website cache sub-list. Detecting the local website cache sub-list can include the following exemplary steps.

When updating the connection-permitted website on the local website sub-list, detecting whether a connection-prohibited website on the local website cache sub-list and a connection-permitted website on the local website sub-list are duplicates, if yes, deleting the website from the local website cache sub-list.

When updating the connection-prohibited website on the local website sub-list, detecting whether a connection-permitted website on the local website cache sub-list and a connection-prohibited website on the local website sub-list are duplicates, if yes, deleting the website from the local website cache sub-list.

With regard to the regular updating discussed in this embodiment, the updating time interval can be set freely. For example, it can be in accordance with a particular need. A preferred time interval in this embodiment can be 3*24 hours. Regularly updating the web site can maintain an accurate determination of the web site as a malicious website. For example, the local website cache sub-list can identify a particular website as a malicious website. Yet, the server website filtering list on the backend server can be updated to identify the website as a harmless website. Thus, during the synchronous updating process, the identified malicious website can be deleted from the local website cache sub-list. Therefore, this mechanism of removing duplicate website can reduce the unnecessary storage space and guarantee a correct identification of the website. At the same time, it is not necessary to upload a target website to the backend for verification, thereby reducing user output and increasing the efficiency of the identification process.

In another embodiment, the malicious website identifying method can also include the step of incrementally updating, in accordance with the websites stored on the server website-filtering list, the corresponding connection-permitted websites and connection-prohibited websites on the local website cache sub-list. The incremental-updating model, which does not update all websites on the list, but rather only performs updates directed to the websites being identified differently in the different lists, can effectively prevent bandwidth from being wasted. For example, if the local website cache sub-list identifies a particular website as a malicious website, but the server website-filtering list on the backend server has been updated to identify the website as a harmless website, the malicious website identified in the local website cache sub-list can be deleted during the synchronous updating process. Data can be continuously pushed to the client device using the incremental-updating model, thereby increasing the interactivity between the client device and the server.

In another embodiment, the method can also include deleting a connection-permitted web site and a connection-prohibited web site from the local web site cache sub-list in accordance with a predetermined time. The predetermined time in this embodiment can be set freely. The connection-permitted websites and the connection-prohibited websites in the local website cache sub-list can be sorted out in accordance with the predetermined time. For example, a website might have been a malicious website during a particular time period, but has become a harmless website after a period of time. This regularly scheduled deletion mechanism can guarantee that the identification is correct and, at the same time, reducing user bandwidth and increasing the speed of the identification process. An exemplary predetermined time can be 7*24 hours.

Figure 3:
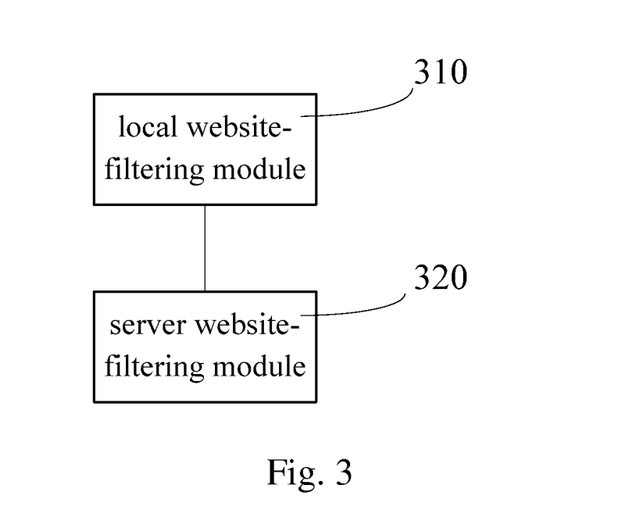
FIG. 3 is a block diagram illustrating the exemplary structure of a malicious website identifying system, according to the first embodiment of the disclosure.

In addition, as illustrated in FIG. 3, a malicious website identifying system can also be provided. The system can include a local website-filtering module 310 and a server website-filtering module 320.

The local website-filtering module 310 can filter a target website: if the target website includes a connection-permitted website in the local website-filtering module 310, permitting a connection to the target website, if the target web site includes a connection-prohibited website in the local website-filtering module 310, blocking a connection to the target website. Websites added to the local website-filtering module 310 can include websites frequently accessed by the user and already confirmed as harmless websites and websites already confirmed to be malicious websites. The origin of the website can be a malicious website encountered during regular browsing or confirmed by an authoritative operator. In this embodiment, the target website can be a website accessible via a browser of a mobile phone when accessing the Internet using the mobile phone. At this time, the system can make sequential determinations regarding the website to be visited, starting with determining whether the website is a connection-permitted website using the local website-filtering module 310, i.e., whether the website is a safe website. If yes, a connection to the website can be permitted. If not, it can be determined whether the website is a malicious website using the local website-filtering module 310. If the website is determined to be a malicious website, it can be blocked from being accessed. Here, blocking access can refer to the system sending a warning to the user but permitting access to the website if the user still visits the website after confirming the warning message. Alternatively, blocking access can also refer to directly blocking any visit to the website. For example, it may be a mobile phone user having root rights taking the measure to block direct access to the website when using the mobile phone to access the Internet.

The server website-filtering module 320 can filter the target website if the target website is not in the local website-filtering module 310: if the target website includes a connection-prohibited website in the server website-filtering module 320, blocking a connection to the target website, if the target website includes a connection-permitted website in the server website-filtering module 320 or is not in the server website-filtering module, permitting a connection to the target website. The server website-filtering module 320 can include websites stored on the backend server. In comparison to the local website-filtering module 310, the website information stored in the server website-filtering module 320 can be more up-to-date. That is, the server website-filtering module 320 can include updated connection-permitted and connection-prohibited websites. A user can connect to the server website-filtering module 320 via a network to perform verification of a target website in order to determine whether the website is a malicious website. If the website is determined to be a connection-permitted website or not to be a malicious website, a connection to the website can be permitted. If the website is determined to be a connection-prohibited website, alert information can be sent out. If a mobile phone is used for accessing the Internet, a measure to block the target website can also be taken against a mobile phone user having root rights.

Figure 4:
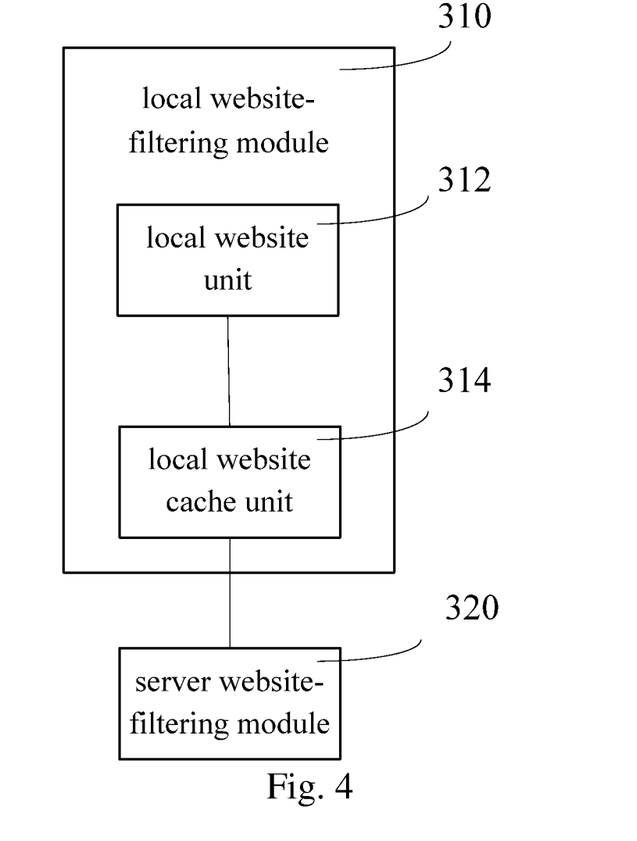
FIG. 4 is a block diagram illustrating the exemplary structure of a malicious website identifying system, according to the second embodiment of the disclosure.

As illustrated in FIG. 4, in this embodiment, the local website filtering module 310 of the above-described malicious web site identifying system can include a local website unit 312 and a local website cache unit 314, the local website unit 312 and the local website cache unit 314 can sequentially filter the target website. The local website unit 312 can store one or more common malicious website as a connection-prohibited website and store one or more common harmless website as a connection-permitted website. The local website cache unit 314 can store at least one dynamically updated malicious website as a connection-prohibited website and store at least one dynamically updated harmless website as a connection-permitted website.

In particular, the local website unit 312 can filter the target website: if the target website includes a connection-permitted website in the local website unit 312, permitting a connection to the target website. If the target website includes a connection-prohibited website in the local website unit 312, blocking a connection to the target website. The connection-permitted and connection-prohibited websites stored on the local network website sub-list 312 can be stored permanently on the local network website sub-list 312. They can be controlled and updated by the operation and maintenance staff. Websites can be added or deleted from the local network website sub-list via, for example, a cloud server. The system default can be set to neither adding nor deleting any of the websites. It can also be defined by the user.

The local website cache unit 314 can filter the target website: if the target website includes a connection-permitted website in the local website cache unit, permitting a connection to the target website, if the target website includes a connection-prohibited website in the local website cache unit, blocking a connection to the target website. The connection-permitted websites and connection-prohibited websites stored in the local website cache unit 314 can be stored dynamically in the local website cache unit 314. The backend server can increasingly push connection-permitted and connection-prohibited websites to the local website cache unit 314. In addition, the server can push connection-permitted and connection-prohibited websites to the local website cache unit 314, as needed. For example, if a situation such as a serious Internet security breach incident or a sudden outbreak of malicious websites is involved, the system can push information regarding the malicious websites to the local website cache unit via a cloud instruction.

Figure 5:
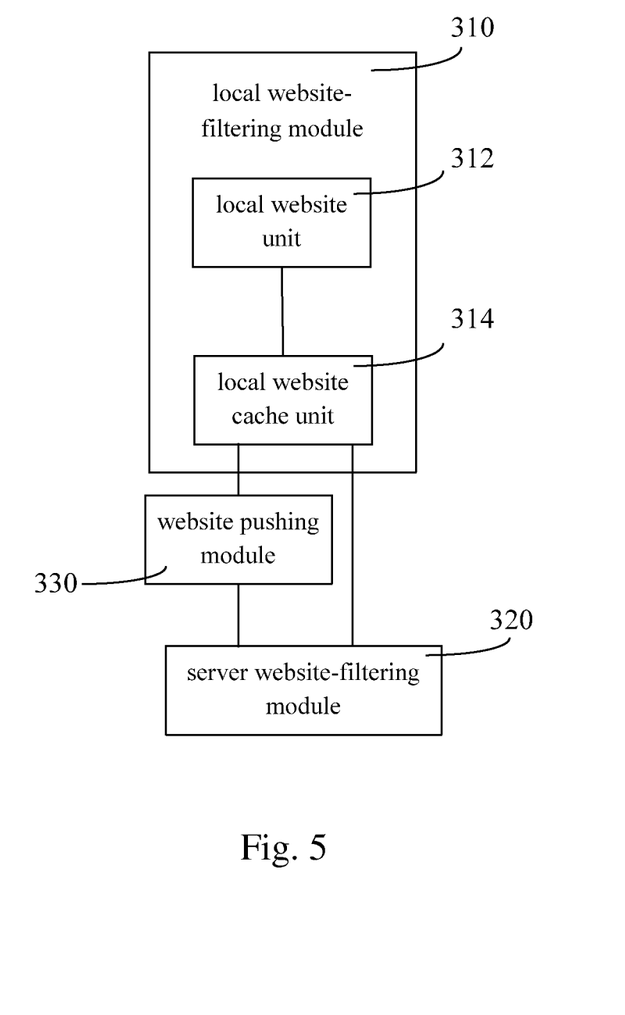
FIG. 5 is a block diagram illustrating the exemplary structure of a malicious website identifying system, according to a third embodiment of the disclosure.

As illustrated in FIG. 5, in a more specific embodiment, the malicious website identifying system can also include a website pushing module 330 that filters the target website using the server website filtering module 320. If a connection to the target website is permitted, pushing the target website to the local website cache unit 314 to be stored as a connection-permitted website. If a connection to the target website is not permitted, pushing the target website to the local website cache unit 314 to be stored as a connection-prohibited website. If the target website is determined to be a safe website, the website can be pushed to the local website cache unit as a connection-permitted website. If the target website is determined to be a malicious website, the website can be pushed to the local website cache unit as a connection-prohibited website. This can continue the updating of the websites in the local website cache unit 314 in real time. When there is a sudden outbreak of malicious websites or when a website is manually determined to be a malicious website, the operation and maintenance staff can push the malicious websites and harmless websites to the corresponding local website cache unit.

Figure 6:
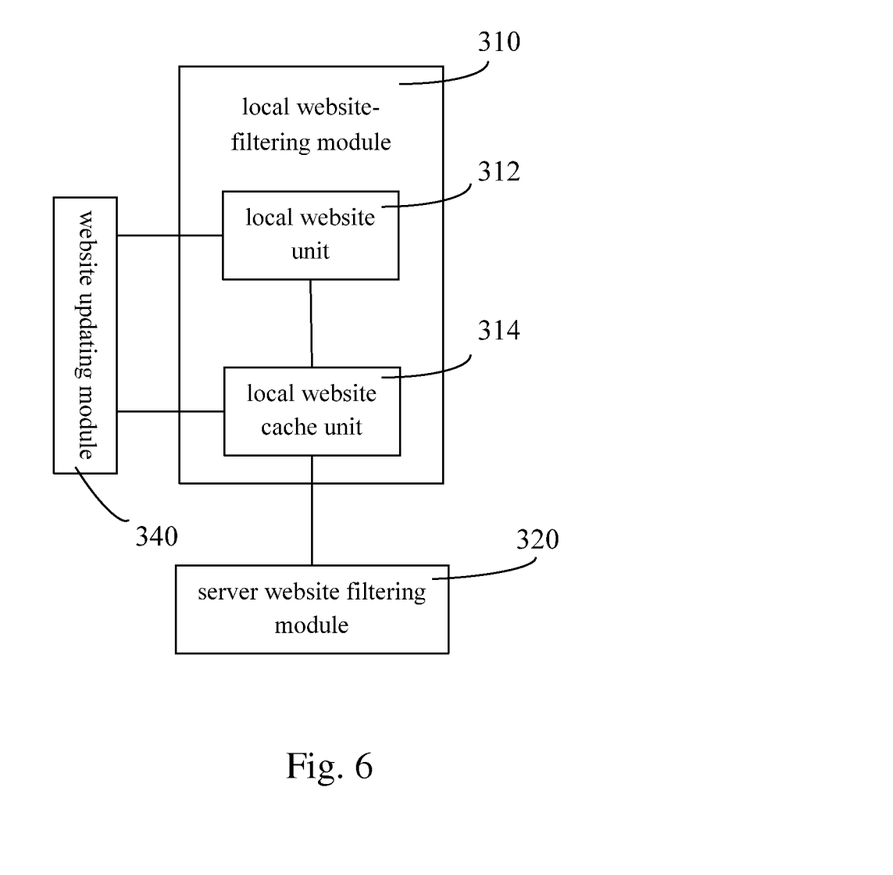
FIG. 6 is a block diagram illustrating the exemplary structure of a malicious website identifying system, according to a fourth embodiment of the disclosure.

As illustrated in FIG. 6, in one embodiment, the above-described malicious website identifying system can also include a website updating module 340 that regularly updates the connection-permitted websites and the connection-prohibited websites in the local website unit 312, and detects the local website cache unit 314. Detecting the local website cache unit 314 can include the following exemplary steps.

When updating the connection-permitted web site in the local web site unit 312, detecting whether a connection-prohibited website in the local website cache unit 314 and a connection-permitted website in the local website unit 312 are duplicates, if yes, deleting the website from the local website cache unit 314.

When updating the connection-prohibited web site on the local web site unit 312, detecting whether a connection-permitted website in the local website cache unit 314 and a connection-prohibited website in the local website unit 312 are duplicates, if yes, deleting the website from the local website cache unit 314.

With regard to the regular updating discussed in this embodiment, the updating time interval can be set freely. For example, it can be in accordance with a particular need. A preferred time interval in this embodiment can be 3*24 hours. Regularly updating the web site can maintain an accurate determination of the web site as a malicious website. For example, the local website cache unit 314 can identify a particular website as a malicious website. Yet, the server website filtering list on the backend server can be updated to identify the website as a harmless website. Thus, during the synchronous updating process, the identified malicious website can be deleted from the local website cache unit 314. Therefore, this mechanism of removing duplicate website can reduce unnecessary storage space and guarantee a correct identification of the website. At the same time, it is not necessary to upload the target website to the backend for verification, thereby reducing user output and increasing the efficiency of the identification process.

Figure 7:
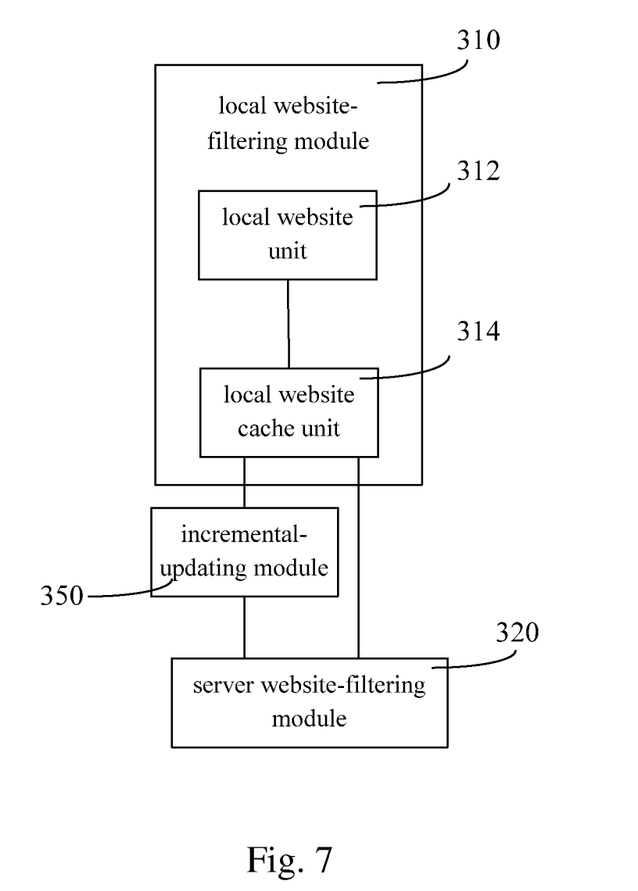
FIG. 7 is a block diagram illustrating the exemplary structure of a malicious website identifying system, according to a fifth embodiment of the disclosure.

As illustrated in FIG. 7, in this embodiment, the malicious website identifying system can also include an incremental-updating module 350 that incrementally updates, in accordance with the websites stored in the server website-filtering module 320, the corresponding connection-permitted websites and connection-prohibited websites in the local website cache unit 314. The incremental-updating model 350, which does not update all websites in the local website cache unit 314, but rather only performs updates directed to the websites being identified differently in the local website cache unit 314 and in the server website-filtering module 320, can effectively prevent bandwidth from being wasted. For example, if the local website cache unit 314 identifies a particular website as a malicious website, but the server website-filtering module 320 on the backend server has been updated to identify the website as a harmless website, the malicious website identified in the local website cache unit 314 can be deleted during the synchronous updating process. Data can be continuously pushed to the client device using the incremental-updating model, thereby increasing the interactivity between the client device and the server.

Figure 8:
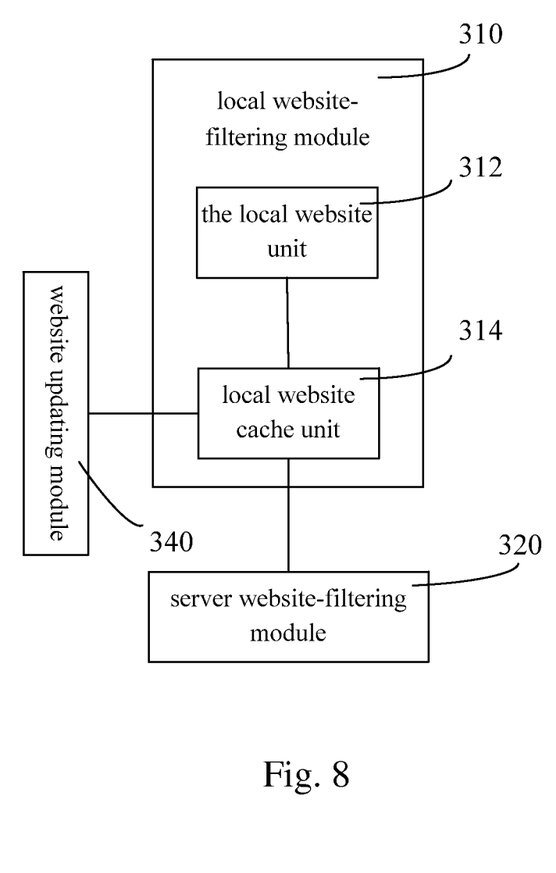
FIG. 8 is a block diagram illustrating the exemplary structure of a malicious website identifying system, according to a sixth embodiment of the disclosure.

As illustrated in FIG. 8, in one embodiment, the above-described malicious website identifying system can also include a website deleting module 360 that deletes a connection-permitted web site and/or connection-prohibited web site from the local website cache unit 314 in accordance with a predetermined time. The predetermined time in this embodiment can be set freely. The connection-permitted websites and the connection-prohibited websites in the local website cache unit 314 can be sorted out in accordance with the predetermined time. For example, a website might have been a malicious website during a particular time period, but became a harmless website after a period of time. This regularly scheduled deletion mechanism can guarantee that the identification is correct and, at the same time, reducing user bandwidth and increasing the speed of the identification process. An exemplary predetermined time can be 7*24 hours.

It should be understood that, in the above-described malicious website identifying methods and systems, as long as there is no conflict, the relevant steps, modules, or units can be combined differently from described-above.

In accordance with the above-described embodiments, a person skilled in the art can understand that parts of or the whole process described in each of the above embodiments can be performed by hardware in accordance with instructions from one or more computer programs. The one or more computer programs can be stored in a non-transitory readable medium, which can be read-only memory (ROM), a floppy disk, or a CD.

In some embodiments, one or more of the modules/units in FIGS. 3-8 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this file, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 9:
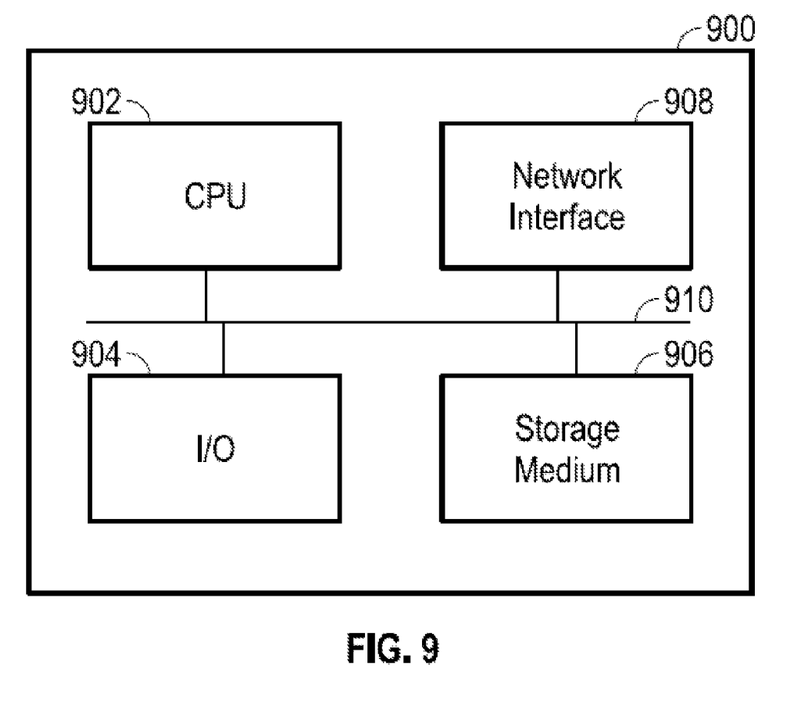
FIG. 9 illustrates exemplary common components of a computing system such as the mobile device in the various embodiments.

The non-transitory computer readable storage medium can be part of a computing system serving as the mobile terminals or devices of the above-described embodiments of the disclosure. FIG. 9 illustrates exemplary common components of one such computing system. As illustrated, the system 900 can include a central processing unit (CPU) 902, I/O components 904 including, but not limited to one or more of display, keypad, touch screen, speaker, and microphone, storage medium 906 such as the ones listed in the last paragraph, and network interface 908, all of which can be connected to each other via a system bus 910. The storage medium 906 can include the modules/units of FIGS. 3-8.

The above description presents only a relatively preferred embodiment of the present invention, and does not mean to restrict this invention. Any modification, equivalent replacement, improvement made on the basis of the spirit and principle of the present invention shall be included in the scope of protection for the present invention.

What is claimed is:
1. A malicious website identifying method, comprising:
sequentially filtering a target website using a local website-filtering sub-list and a local website cache sub-list, the local website-filtering sub-list storing at least one com- mon malicious website as a connection-prohibited website and storing at least one common harmless website as a connection-permitted website, the local website cache sub-list storing at least one dynamically updated malicious website as a connection-prohibited website and storing at least one dynamically updated harmless website as a connection-permitted website, said sequentially filtering comprising:

filtering the target website using the local website-filtering sub-list: if the target website comprises a connection-permitted website on the local website-filtering sub-list, permitting a connection to the target website, if the target website comprises a connection-prohibited website on the local website-filtering sub-list, blocking a connection to the target website, and filtering the target website using the local website cache sub-list: if the target website comprises a connection-permitted website on the local website cache sub-list, permitting a connection to the target website, if the target web site comprises a connection-prohibited website on the local website cache sub-list, blocking a connection to the target website;

if the target website is not on the local website-filtering sub-list nor the local website cache sub-list, filtering the target website using a server website-filtering list: if the target website comprises a connection-prohibited website on the server website-filtering list, blocking a connection to the target website, if the target website comprises a connection-permitted website on the server website-filtering list or is not on the server website-filtering list, permitting a connection to the target website; and regularly updating the at least one connection-permitted website and at least one connection-prohibited website on the local website-filtering sub-list, and detecting the local website cache sub-list, wherein detecting the local website cache sub-list comprises:

when updating the at least one connection-permitted website on the local website-filtering sub-list, detecting whether a connection-prohibited website on the local website cache sub-list and a connection-permitted website on the local website-filtering sub-list are duplicates, if yes, deleting the website from the local website cache sub-list, and when updating the connection-prohibited website on the local website-filtering sub-list, detecting whether a connection-permitted website on the local website cache sub-list and a connection-prohibited website on the local website-filtering sub-list are duplicates, if yes, deleting the website from the local website cache sub-list.

2. A malicious website identifying method, comprising:
sequentially filtering a target website using a local website-filtering sub-list and a local website cache sub-list, the local website-filtering sub-list storing at least one common malicious website as a connection-prohibited website and storing at least one common harmless website as a connection-permitted website, the local website cache sub-list storing at least one dynamically updated malicious website as a connection-prohibited website and storing at least one dynamically updated harmless website as a connection-permitted website, said sequentially filtering comprising:

filtering the target website using the local website-filtering sub-list: if the target website comprises a connection-permitted website on the local website-filtering sub-list, permitting a connection to the target website, if the target website comprises a connection-prohibited website on the local website-filtering sub-list, blocking a connection to the target website, and filtering the target website using the local website cache sub-list: if the target website comprises a connection-permitted website on the local website cache sub-list, permitting a connection to the target website, if the target web site comprises a connection-prohibited website on the local website cache sub-list, blocking a connection to the target website;

if the target website is not on the local website-filtering sub-list nor the local website cache sub-list, filtering the target website using a server website-filtering list: if the target website comprises a connection-prohibited website on the server website-filtering list, blocking a connection to the target website and pushing the target website to the local website cache sub-list to be stored as a connection-prohibited website, if the target web site comprises a connection-permitted website on the server website-filtering list or is not on the server website-filtering list, permitting a connection to the target website and pushing the target website to the local website cache sub-list to be stored as a connection-permitted website; and deleting a connection-permitted website and a connection-prohibited website from the local website cache sub-list in accordance with a predetermined time.

3. A device comprising:
a processor,
a display,
a first memory unit that stores a first list, the first list comprising connection-permitted websites and connection-prohibited websites,
a cache memory unit that stores a second list, the second list comprising connection-permitted websites and connection-prohibited websites,
a network interface that facilitates communication with a remote sever that stores a third list, the third list comprising connection-permitted websites and connection-prohibited websites, and
a second memory unit that stores a program which, when executed by the processor, performs the steps of:
determining whether to permit or prohibit access to a target website in accordance with the first list,
when the first list is insufficient to determine whether to permit or prohibit access to the target website, determining whether to permit or prohibit access to the target website in accordance with the second list,
when the first list and the second list are insufficient to determine whether to permit or prohibit access to the target website, communicating with the remove server via the network interface to determine whether to permit or prohibit access to the target website in accordance with the third list,
displaying the target web site on the display in accordance with a determination to permit access to the target website,
displaying a message on the display in accordance with a determination to prohibit access to the target website, and
removing a website from the second list when the website is identified differently on the first list.

* * * * *